United States Patent [19]
Kitamura et al.

[11] Patent Number: 5,996,009
[45] Date of Patent: *Nov. 30, 1999

[54] SYSTEM AND METHOD FOR ADMINISTERING A NETWORK HAVING HIERARCHICALLY ORGANIZED MANAGED OBJECTS

[75] Inventors: Machiko Kitamura; Keiko Arima, both of Tokyo, Japan

[73] Assignee: NEC Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/607,306

[22] Filed: Feb. 26, 1996

[30] Foreign Application Priority Data

Feb. 24, 1995 [JP] Japan ................................ 7-036634

[51] Int. Cl.⁶ .............................. G06F 13/00; H04L 12/24
[52] U.S. Cl. ........................ 709/223; 709/224; 709/228; 709/238; 709/242; 709/201; 709/202; 707/10
[58] Field of Search .......................... 395/200.1, 200.15, 395/200.2, 200.5–200.54, 200.58, 200.76, 200.57; 709/220–224, 227–228, 246, 201–202, 237–238, 242; 710/200, 240; 707/10, 100, 200–203, 206

[56] References Cited

U.S. PATENT DOCUMENTS

| | | | |
|---|---|---|---|
| 5,210,753 | 5/1993 | Natarajan ................................ | 370/338 |
| 5,222,238 | 6/1993 | Zobre et al. ............................. | 710/240 |
| 5,261,088 | 11/1993 | Baird et al. ............................. | 707/206 |
| 5,465,330 | 11/1995 | Komatsu et al. ........................ | 709/222 |
| 5,491,822 | 2/1996 | Allen et al. ............................. | 709/303 |
| 5,606,669 | 2/1997 | Bertin et al. ........................... | 709/223 |
| 5,630,184 | 5/1997 | Roper et al. ............................ | 709/221 |
| 5,832,487 | 11/1998 | Olds et al. .............................. | 707/10 |

FOREIGN PATENT DOCUMENTS 94 23514  10/1994  WIPO ........................... H04L 12/24

OTHER PUBLICATIONS

O. Wolfson, et al., "Managing Communication Networks by Monitoring Databases", IEEE Transactions on Software Engineering, vol. 17, No. 9, Sep. 1, 1991.

K. Terplan, "Standard Multivendor Network Management", Proceedings of the Network Operations and Management Symposium, vol. 1–2–3, Jan. 1, 1992.

Primary Examiner—Zarni Maung
Assistant Examiner—Bharat Barot
Attorney, Agent, or Firm—Ostrolenk, Faber, Gerb & Soffen, LLP

[57] ABSTRACT

In deletion of a managed object in a hierarchically organized network, when a deletion request of the managed object is received which has child objects included therein and at least one active managed object is included in the managed object in question, a completion waiting table is generated which contains each active managed object of the managed object in question. Monitoring the completion waiting table while updating it each time an active managed object completes the active operations, the deletion of the managed object in question is waited until each active managed object included in the managed object completes all the active operations.

10 Claims, 4 Drawing Sheets

FIG. 4

ACTIVE STATE TABLE 305

| MANAGED OBJECT NAME | NUMBER OF ACTIVE OPERATIONS ($N_i$) |
|---|---|
| A | 1 |
| B | 1 |
| D | 2 |
| F | 1 |
| G | 1 |
| H | 1 |
| J | 2 |

FIG. 5

WAITING TABLE 306 FOR COMPLETION OF OPERATIONS

| OBJECT NAME REQUESTED TO BE DELETED | B |
|---|---|
| ACTIVE OBJECT NAME(S) OF PARENT OBJECT AND ITS CHILDREN | B |
| | D |
| | F |
| | G |
| | |

SYSTEM AND METHOD FOR ADMINISTERING A NETWORK HAVING HIERARCHICALLY ORGANIZED MANAGED OBJECTS

BACKGROUND OF THE INVENTION

1. Field of the Invention

The present invention generally relates to a system for administrating network elements, and in particular to an system and method for managing network nodes or workstations which are organized in a hierarchical structure.

2. Description of the Related Art

In networking and telecommunications, it is well known that an OSI (Open Systems Interconnection) provides a seven-layer model as well known. Since an open system in the OSI is a computer that supports the model for connecting systems on a network and communicating among these computers, the OSI is used to easily construct a heterogeneous network, which results in an increasing number of network elements, especially, in a nationwide network. In cases where a wide area network includes a large number of network elements which are separated by distances on a nationwide scale, a hierarchical management strategy is preferably employed to efficiently administrate such a wide area network.

In the hierarchical management, a single management workstation manages the network hosts or nodes, terminals and cables (hereinafter referred to as "objects") in various layers which are hierarchically organized into a tree structure for network management. More specifically, as shown in FIG. 1, the tree consists of a topmost (or root) object (A) and child objects that are directly below the topmost object (A). A child object itself is a tree, and can have child objects of its own. In other words, a child object is included in a parent object in all layers. Such a tree, as shown in FIG. 1, is stored in a tree table provided in the management workstation.

A reception module which is a process generated in the management workstation is capable of controlling each of the objects such that the various settings of an object (e.g. a host computer) are read out or changed and further the object is deleted or another object is attached on the network. In the case of deletion of an object on the network, the reception module cannot delete the object in question without confirming that all the child objects of the object are inactive. In order to do such a confirmation, the management workstation is provided with an active state table which contains active object names as well as the numbers of active operations corresponding to the respective active object names. The deletion of an object can be performed only when the object in question and its child objects have no active operations, that is, the number of active operations is zero.

Referring to FIG. 2, when a network administrator requests the deletion of an object, the management workstation generates a sending module which is a request sending process and the reception module receives the deletion request from the sending module (steps S101 and S102). Upon reception of the deletion request, the reception module retrieves the object and its child objects from the tree table and then checks whether the retrieved objects include an active object with referring to the active state table (step S104). If at least one active object is included in the retrieved objects, an error message that the deletion is impossible is sent back to the sending module, and otherwise the object and its child objects are deleted (steps S105–S107).

In this manner, taking the tree structure as shown in FIG. 1 as an example, the node (B) requested to be deleted and its child nodes (C)–(G) are deleted from the network by the network administration workstation.

However, in the conventional method, the network administrator receives only the error message when an active object is included in the tree of the object requested to be deleted. Therefore, the network administrator has to retry the same deletion request after a lapse of an appropriate time interval. In addition, the sending module has to check whether the deletion request input from the network administrator is properly received by the control module. Therefore, the sending module is burdened with complicated tasks.

SUMMARY OF THE INVENTION

An object of the present invention is to provide a network administration method which enables deleting an object and its child objects without burdening a network administrator with request steps.

Another object of the present invention is to provide a network administration method which enables deleting an object and its child objects by receiving only one deletion request.

According to the present invention, in cases where a deletion request of a managed object is received which has child objects included therein and at least one active managed object is included in the managed object in question, a completion waiting table is generated which contains each active managed object of the managed object in question. Monitoring the completion waiting table while updating it each time an active managed object completes the active operations, the deletion of the managed object in question is delayed until each active managed object included in the managed object completes all the active operations.

More specifically, an inclusion relation of the managed objects of the network is stored into an inclusion relation table, and an active state of the managed objects is stored into an active state table. The active state represents each active managed object of the managed objects performing at least one active operation. The active state also includes the number of active operations which are currently performed in each active managed object. When receiving a deletion request of a first managed object from a network administrator, a second managed object is specified by referring to the inclusion relation table such that the second managed object consists of the first managed object and at least one managed object which is included in the first managed object when the first managed object is not an end managed object and that the second managed object consists of the first managed object when the first managed object is an end managed object. Subsequently, in cases where the second managed object includes an active managed object, a completion waiting table for storing a completion waiting state is generated where the completion waiting state represents each active managed object included in the second managed object. Finally, the second managed object is deleted from the inclusion relation table when each active managed object included in the second managed object completes all active operations.

Therefore, once receiving the deletion request of the managed object, the deletion of the managed object in question is performed after it is determined that each active managed object included in the managed object completes all the active operations. Furthermore, since the completion waiting table is generated from the active state table and the inclusion relation table and is updated each time an active managed object completes the active operations, it is easy to determine whether the managed object in question is permitted to be deleted from the network.

BRIEF DESCRIPTION OF THE DRAWINGS

FIG. 4 is a diagram showing an active state table of the network administration workstation;

FIG. 5 is a diagram showing a waiting table of the network administration workstation.

DETAILED DESCRIPTION OF THE PREFERRED EMBODIMENTS

Figure 3:
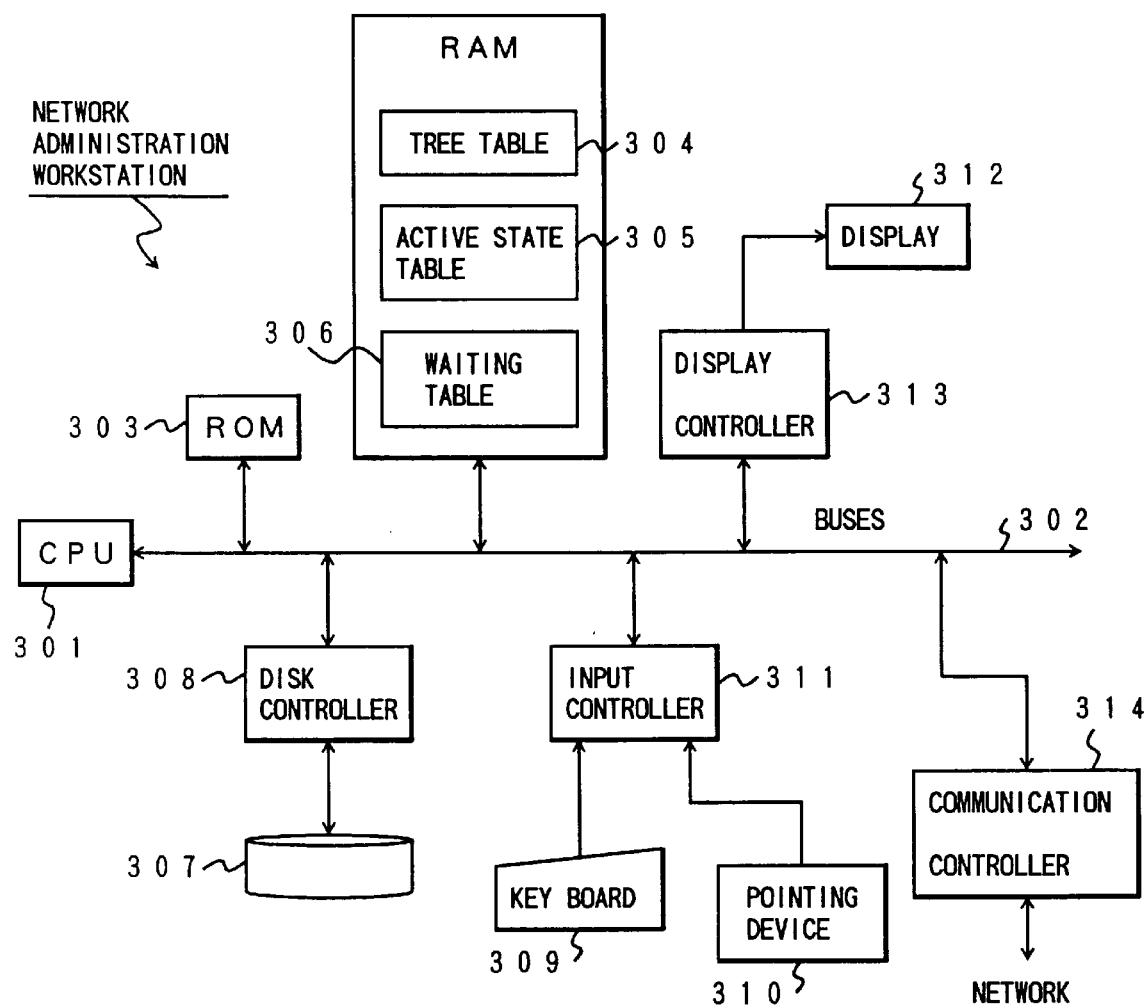
FIG. 3 is a block diagram showing a network administration workstation implementing a network administration method according to an embodiment of the present invention.

Referring to FIG. 3, a network administration workstation according the present invention is composed of a core processor (CPU) 301 which generates various processes including the sending and reception modules mentioned above by using the workstation elements connected thereto through several buses 302 including data buses. A read-only memory (ROM) 303 stores administration programs including a boot program and other necessary fixed data.

Figure 1:
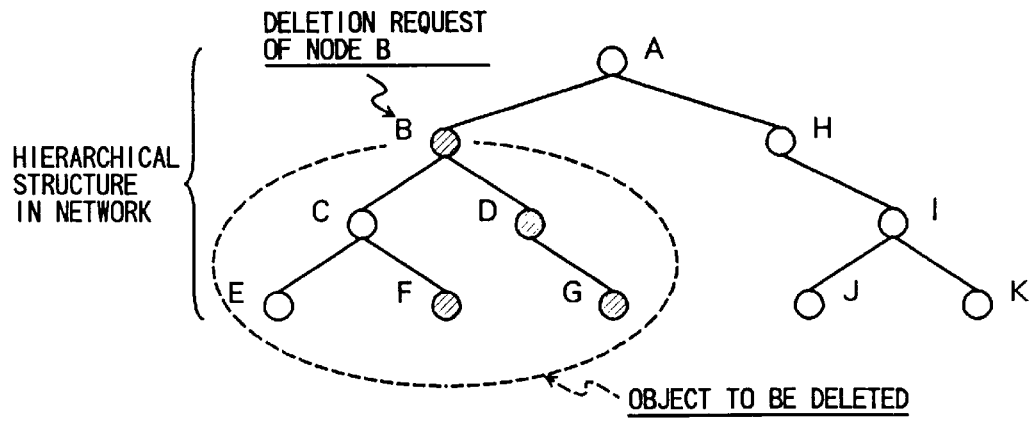
FIG. 1 is a diagram showing a network configuration having a tree structure.
Figure 2:
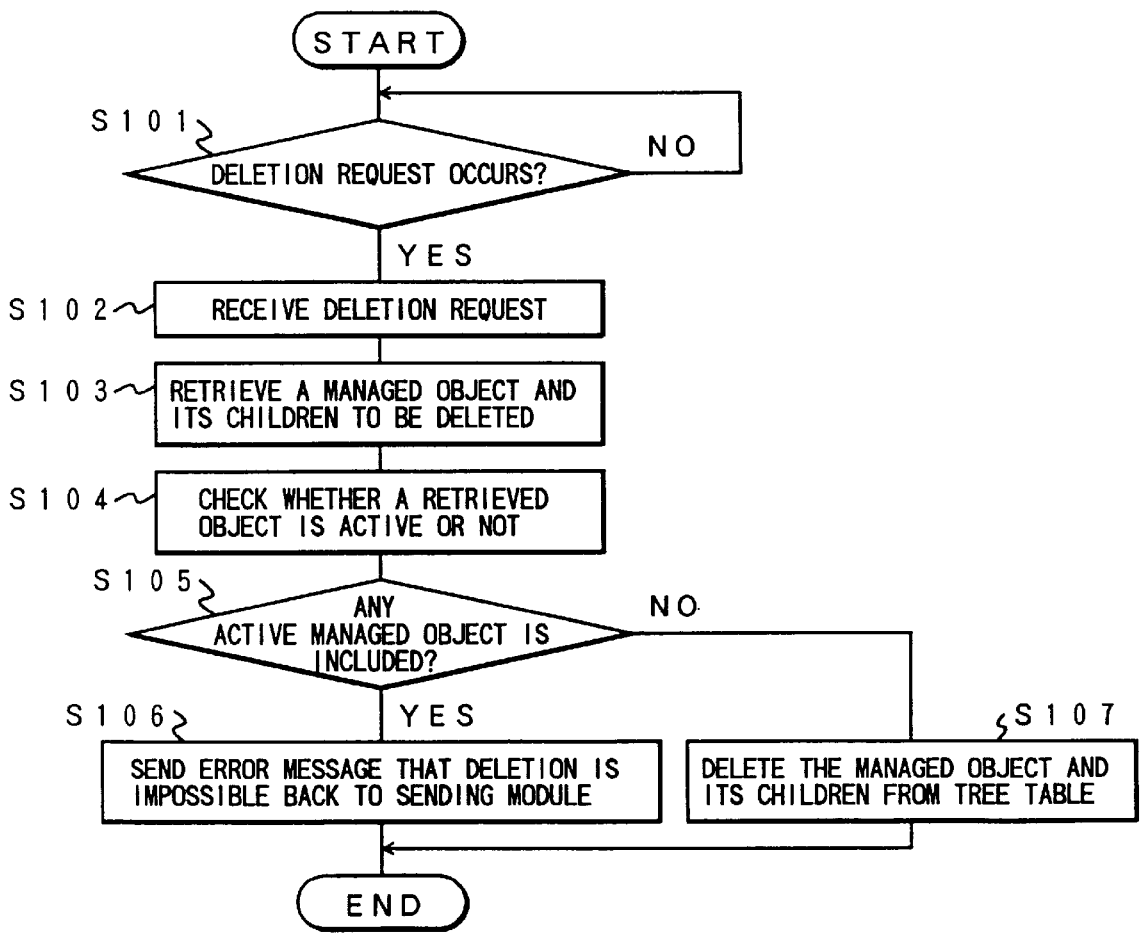
FIG. 2 is a flowchart showing a conventional object deletion method.

A random access memory (RAM) stores a tree table 304, an active state table 305, a waiting table 306, and temporary data necessary for program execution. The tree table 304 stores the inclusion relation of all the objects as shown in FIG. 1. The active state table 305 and the waiting table 306 are used to perform an object deletion process according to the present invention as described later.

A magnetic disk storage 307 stores various programs and data necessary for network administration. The magnetic disk storage 307 is controlled by a disk controller 308 which is connected to the processor 301 through the buses 302. A keyboard 309 and a pointing device 310 such as a mouse are used to input commands or various requests including the deletion request of a managed object on the network. These input devices 309 and 310 are controlled by an input controller 311. A display device 312 displays various characters and figures including a mouse pointer on screen under control of a display controller 313. Finally, a communication controller 314 is connected to a transmission cable of the network to transmit commands to one of the managed objects and to receive various information from the managed objects.

For reference purposes, when the network administration workstation is powered on, the whole network map of Japan is initially displayed on the display 312. Since the whole network is hierarchically organized as shown in FIG. 1, the network administration workstation can scale up the network map of a desired area referring to the tree table 304 when a network administrator clicks the area on screen with the mouse. Similarly, a single terminal included in the area may be specified by clicking it. In this manner, one or more objects located in a desired area can be specified, and then the network administration workstation can manage a desired one or partial group of the objects. In cases where a new object will be added to a desired area of the network map, the network administrator inputs predetermined commands for addition of the new object to the network administration workstation through the keyboard 309 and the pointing device 310 and thereby the new object is added to the tree table 304. Contrarily, when a specified object will be disconnected from the desired area of the network map in case of some failure, as described before, it is necessary that not only the specified object but also all the child objects thereof are inactive. Receiving predetermined commands for deletion of the specified object from the network administrator through the keyboard 309 and the pointing device 310, the network administration workstation generates the sending module and the reception module and then performs the object deletion process according to the present invention using the active state table 305 and the waiting table 306 as described later.

Referring to FIG. 4, the active state table 305 contains active object names and the numbers of active operations. It is assumed in this case that objects (A), (B), (D), (F), (G), (H), and (J) are active and have the respective numbers ($N_i$) of active operations as shown in FIG. 4. If the object (E) of FIG. 1 receives a first operation and changes its state from inactive to active, the reception module registers the object name (E) to the active state table 305 and sets the number of active operations of the object (E) at 1. When the object (E) further receives a second operation, the reception module increments the number of active operations of the object (E) by one. Contrarily, for example, when a single operation is completed in the object (D) as shown in FIG. 4, the reception module decrements the number of active operations of the object (D) by one.

Referring to FIG. 5, the waiting table 306 contains object names which are waiting for completion of its operations so as to be deleted from the network. Because the reception module cannot delete an object from the network without the object and its child objects all inactive. More specifically, the waiting table 306 contains an object name which is requested to be deleted by the network administrator and its child object names which are now active. In other words, among the active objects registered in the active state table 305, the requested object and its child objects are registered into the waiting table 306. It is assumed in this case that the object (B) is requested to be deleted from the network and its child objects (D), (F), and (G) are active with having the respective numbers ($N_i$) of active operations as shown in FIG. 4.

OBJECT DELETION OPERATION

Figure 6:
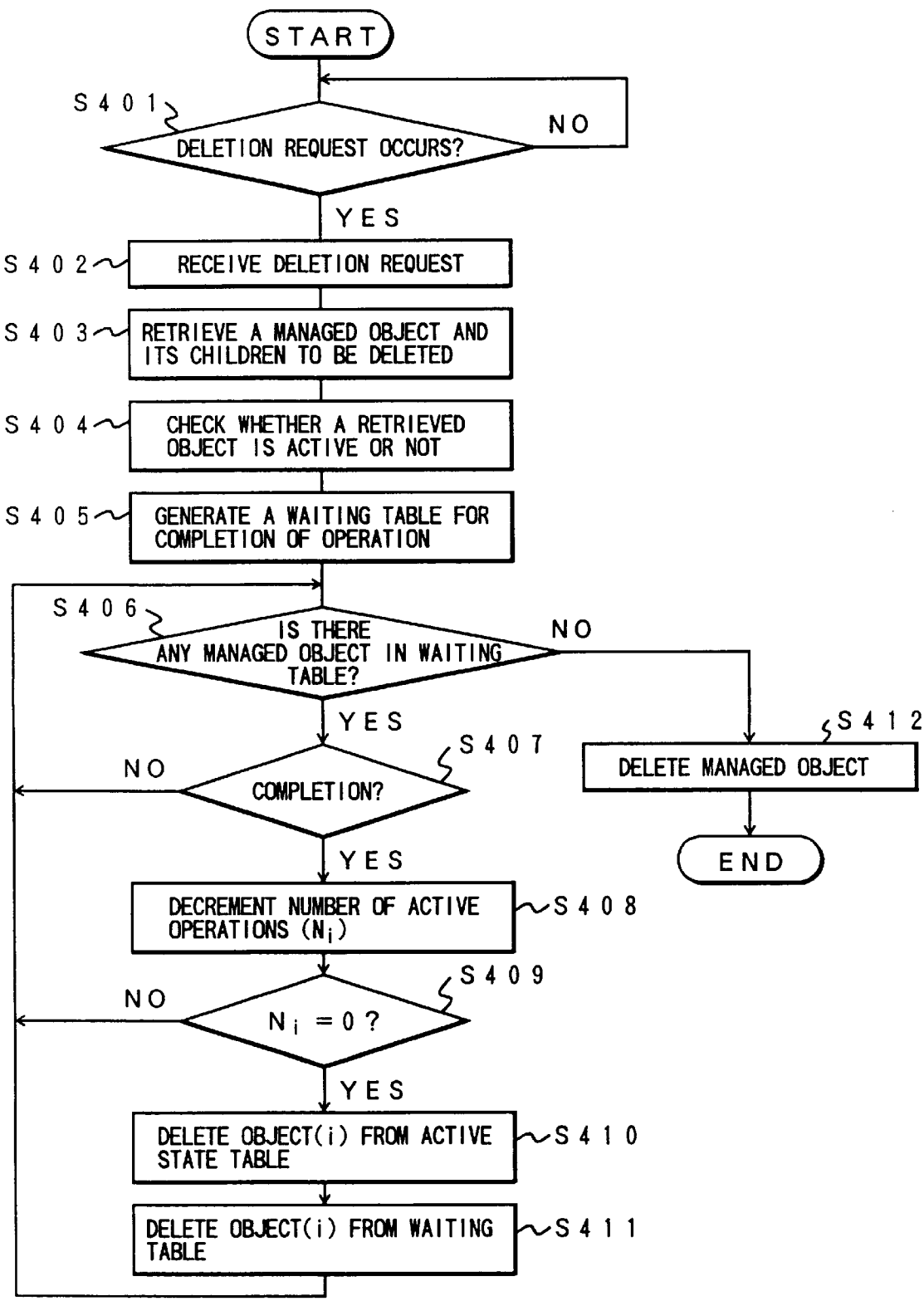
FIG. 6 is a flowchart showing a network administration method according to the embodiment.

Referring to FIG. 6, when a network administrator requests the deletion of the object (B), the sending module detects the deletion request (YES in step S401) and then the reception module receives the deletion request from the sending module (step S402). Upon reception of the deletion request, the reception module retrieves the object (B) and its child objects (C)–(G) from the tree table 304 (step S403) and then checks whether the retrieved objects (B)–(G) include an active object by referring to the active state table 305 as shown in FIG. 4 (step S404). If at least one active object is included in the retrieved objects, the waiting table 306 is generated (step 405). Since the requested object (B) and its child objects (D), (F), and (G) are active in this case, the waiting table 306 as shown in FIG. 5 is generated and stored in the RAM.

Subsequently, the reception module checks whether any object exists in the waiting table 306 (S406). If at least one object is included in the waiting table 306 (YES in step S406), then the reception module checks whether any operation is completed or not (step S407). When no operation is completed (NO in step S407), the checking steps S406 and S407 are repeated until an operation is completed.

When one or more operations of the objects(B), (D), (F) and (G) are completed (YES in step S407), the respective numbers ($N_i$) of active operations thereof are decremented in the active state table 305 (step S408). After that, if there exists an object having no active operations ($N_i$=0) (YES in step S409), then the corresponding object (i) is deleted from the active state table 305 and the waiting table 306 (steps S410 and S411). When all the objects in question remains active (NO instep S409), the steps S406–S409 are repeated until at least one object becomes inactive.

In cases where the active state table 305 and the waiting table 306 are shown in FIGS. 4 and 5, respectively, when the operation of the child object (F), for instance, is completed, the number of active operations of the child object (F) becomes zero. Therefore, the name of the child object (F) is deleted from the active state table 305 and the waiting table 306. In this manner, the steps S406–S411 are repeated until the waiting table 306 is empty, that is, the object requested to be deleted and its child objects are all inactive.

When the object requested to be deleted and its child objects are all inactive (NO in step S406), the reception module can delete the requested object and its child objects from the tree table (S412). In the case of FIGS. 4 and 5, where the object (B) and its child objects (D), (F), and (G) are active, only when these objects become all inactive, the object (B) and all the child objects (C)–(G) can be deleted from the network.

What is claimed is:

1. A method for administrating a network where a plurality of managed objects are hierarchically organized in an inclusion relation, the method comprising the steps of:

a) receiving a deletion request of a first managed object;

b) specifying a managed object group whose top managed object is the first managed object, the managed object group including the first managed object and at least one object 10 subsidiary to the first managed object;

c) determining whether the managed object group, including the first managed object and the at least one object subsidiary to the first managed object, includes an active managed object which is performing an active operation;

d) waiting until the active managed object completes the active operation when the managed object group includes the active managed object; and e) deleting all managed objects included in the managed object group from the network, based on the deletion request, when the managed object group does not include any active managed object and further wherein the step (d) comprises:

d.1 generating a waiting table when the managed object group includes at least one active managed object, the waiting table containing an identifier of each active managed object included in the managed object group;

d.2 deleting the identifier of an active managed object from the waiting table when the active managed object completes the active operation; and d.3 waiting until the waiting table does not contain an identifier.

2. The method according to claim 1, wherein the step (c) comprises:

generating an active state table of the managed objects, the active state table containing an active state of each active managed object; and determining whether the managed object group includes an active managed object referring to the active state table.

3. The method according to claim 1, wherein the step (d) comprises:

checking a number of active operations which are being performed by each active managed object included in the managed object group;

decrementing the number of the active operations by one when one active operation is completed; and determining that the active managed object completes all active operations when the number of the active operations reaches zero.

4. The method according to claim 1, wherein the step d.2 comprises:

checking a number of active operations which are being performed by each active managed object included in the managed object group;

decrementing the number of the active operations by one when one active operation is completed; and determining that the active managed object completes all active operations when the number of the active operations reaches zero.

5. A method for administrating a network comprising a plurality of managed objects, the method comprising the steps of:

a) storing an inclusion relation of the managed objects of the network onto an inclusion relation table;

b) storing an active state of each active managed object onto an active state table, each active managed object performing at least one active operation;

c) receiving a deletion request of a first managed object;

d) specifying a managed object group whose top managed object is the first managed object by referring to the inclusion relation table, the managed object group including the first managed object and at least a subsidiary object;

e) determining whether the managed object group, including the first managed object and the at least subsidiary object, includes an active managed object by referring to the active state table;

f) generating a waiting table when the managed object group includes at least one active managed object, the waiting table containing an identifier of each active managed object included in the managed object group;

g) updating the waiting table by deleting the identifier of an active managed object from the waiting table when the active managed object completes the active operation;

and h) deleting all managed objects included in the managed object group from the inclusion relation table, based on the deletion request, when the waiting table does not contain an identifier.

6. The method according to claim 5, wherein the step (g) comprises:

checking a number of active operations which are being performed by each active managed object included in the managed object group;

decrementing the number of the active operations by one when one active operation is completed;

determining that the active managed object completes all active operations when the number of the active operations reaches zero; and updating the waiting table when the active managed object completes all active operations.

7. The method according to claim 5, wherein the step (h) comprises:

waiting execution of the deletion of all managed objects until the waiting table does not contain an identifier.

8. A system for administrating a network where a plurality of managed objects are hierarchically organized in an inclusion relation, the system comprising:

receiving means for receiving a deletion request of a first managed object;

specifying means for specifying a managed object group whose top managed object is the first managed object, the managed object group including the first managed object and at least one subsidiary object; and deletion control means for determining whether the managed object group, including the first managed object and the at least one subsidiary object, includes an active managed object which is performing an active operation, waiting until the active managed object completes the active operation when the managed object group includes the active managed object, and deleting all managed objects included in the managed object group from the network, based on the deletion request, when the managed object group does not include any active managed object and further wherein the deletion control means generates a waiting table when the managed object group includes at least one active managed object, the waiting table containing an identifier of each active managed object included in the managed object group, deletes the identifier of an active managed object from the waiting table when the active managed object completes the active operation, and waits until the waiting table does not contain an identifier.

9. The system according to claim 8, wherein the deletion control means checks a number of active operations which are being performed by each active managed object included in the managed object group, decrementing the number of the active operations by one when one active operation is completed, and determines that the active managed object completes all active operations when the number of the active operations reaches zero.

10. A system for administrating a network where a plurality of managed objects are hierarchically organized in an inclusion relation, the system comprising:

a receiver receiving a deletion request of a first managed object;

a specifying device specifying a managed object group whose top managed object is the first managed object, the managed object group including the first managed object and at least a subsidiary object; and a deletion control determining whether the managed object group, including the first managed object and the at least one subsidiary object, includes an active managed object which is performing an active operation, waiting until the active managed object completes the active operation when the managed object group includes the active managed object, and deleting all managed objects included in the managed object group from the network, based on the deletion request, when the managed object group does not include any active managed object and further wherein the deletion control generates a waiting table when the managed object group includes at least one active managed object, the waiting table containing an identifier of each active managed object included in the managed object group, deletes the identifier of an active managed object from the waiting table when the active managed object completes the active operation, and waits until the waiting table does not contain an identifier.

\* \* \* \* \*